[26.]
A. B. Armstrong. Cheese Vat
No. 118,507.   Fig. 1.   Patented Aug. 29, 1871.
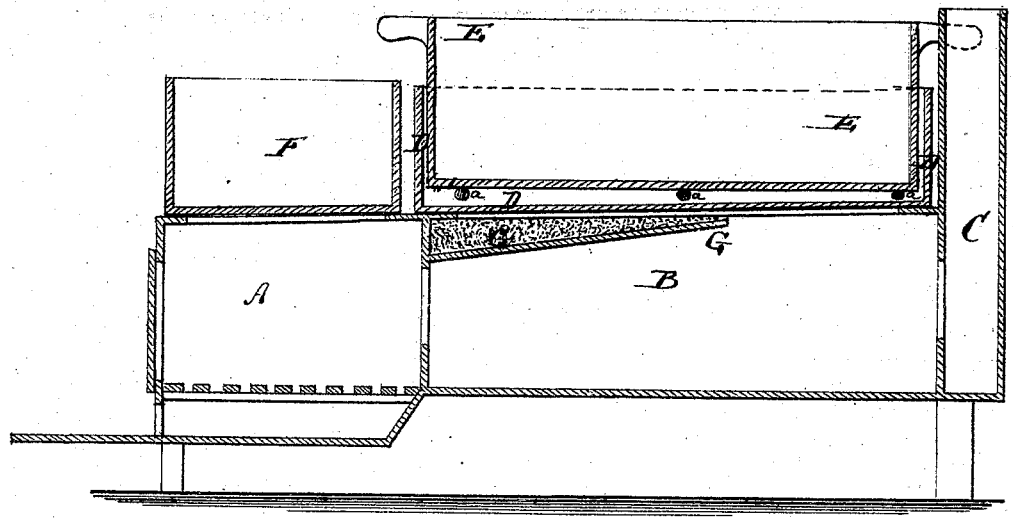
Fig. 2.
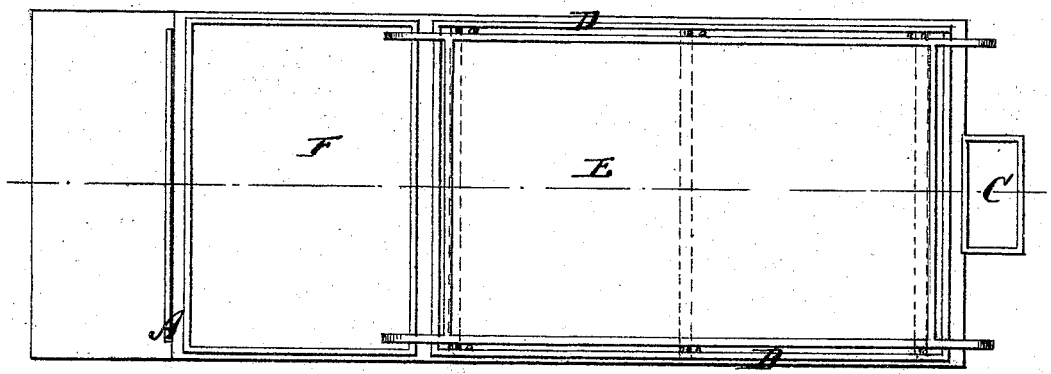
Witnesses:
John Becker
Wm. H. C. Smith
Inventor:
A. B. Armstrong
per ——— Attorneys.

UNITED STATES PATENT OFFICE.

AUGUSTUS B. ARMSTRONG, OF DORSET, VERMONT.

IMPROVEMENT IN CHEESE-VATS.

Specification forming part of Letters Patent No. 118,507, dated August 29, 1871.

*To all whom it may concern:*

Be it known that I, AUGUSTUS B. ARMSTRONG, of Dorset, in the county of Bennington and State of Vermont, have invented a new and Improved Cheese-Vat; and I do hereby declare that the following is a full, clear, and exact description thereof, which will enable others skilled in the art to make and use the same, reference being had to the accompanying drawing forming part of this specification, in which—

Figure 1 represents a vertical longitudinal section of my improved cheese-vat. Fig. 2 is a plan or top view of the same.

Similar letters of reference indicate corresponding parts.

This invention has for its chief object to equalize the heat under the water-vat so that the curd will receive an even temperature throughout. The production of cheese from a given quantity of milk will thereby become more profitable on account of greater weight and better quality obtained. The invention consists in the application of mulching-plates between the front portion of the furnace and the front part of the water-vat, and in the placing of ashes or equivalent material upon such plate; also, in the arrangement of supporting-rods or lugs within the water-vat for holding the cheese-vat, so that the water is higher under its front than in rear, all serving to so spread or equalize the heat under the cheese-vat as to bring its contents to a uniform temperature throughout.

A in the drawing represents the fire-chamber; B, the hot-gas chamber; C, the smoke-flue of the furnace. D is the hot-water vat, placed over the chamber B and containing the cheese-vat E. F is a water-tank placed over the fire-chamber in front of the vat D, so that it will utilize the heat which would otherwise be wasted into the room. G is a mulching-plate secured in the chamber B under the front part of the vat D, and in an inclined position, as shown. Ashes or other matter is placed upon this plate against the bottom of the vat D, so as to prevent the extreme heat from striking the front of the vat, while in rear it would be less heated. The vat D contains cross-bars or lugs, *a a*, which support the vat E in such manner that its bottom is level, while the bottom of the vat D is inclined so that more water will be under the front portion of the vat E than under the back. The heat of the milk is thereby also equalized. The fire-arch, sides, and bottom of the furnace should be lined with brick, or other non-conducting material, to hold the heat up to the scalding-point during the time required by the process.

Having thus described my invention, I claim as new and desire to secure by Letters Patent—

1. The mulching-plate or plates G, arranged within the heating apparatus of a cheese-vat, as set forth.

2. The water-vat D, placed in an inclined position, and provided with supports *a*, so that it will hold the cheese-vat level, substantially as and for the purpose herein shown and described.

AUGUSTUS B. ARMSTRONG.

Witnesses:
 C. F. SWETT,
 GEO. F. BOYNTON.